J. KIEL.
HARROW.
APPLICATION FILED APR. 27, 1911.
1,184,754. Patented May 30, 1916.
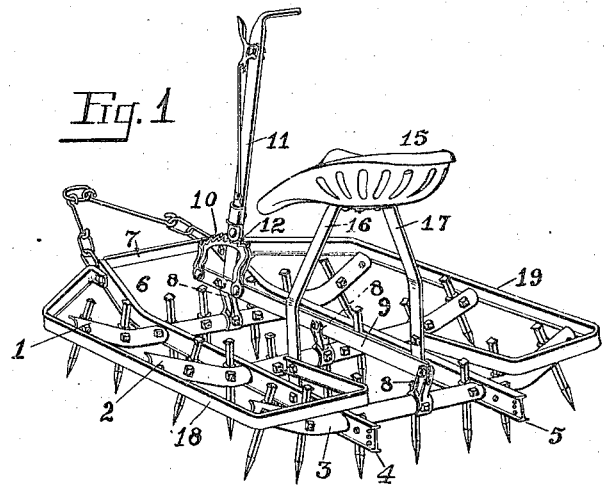
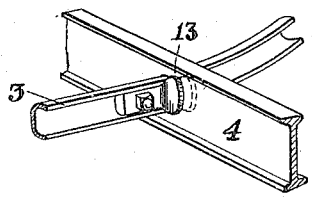
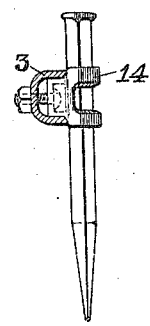
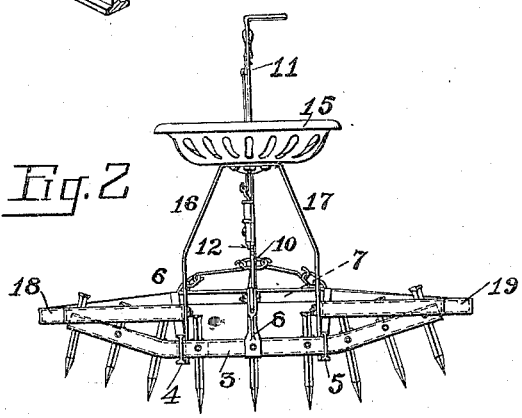
Witnesses
H. E. Rich
A. A. Conwell
Inventor
John Kiel
by W. C. Irdiustou
his Attorney

UNITED STATES PATENT OFFICE.

JOHN KIEL, OF MOLINE, ILLINOIS, ASSIGNOR TO DEERE AND COMPANY, OF MOLINE, ILLINOIS, A CORPORATION OF ILLINOIS.

HARROW.

1,184,754. Specification of Letters Patent. Patented May 30, 1916.

Application filed April 27, 1911. Serial No. 623,636.

*To all whom it may concern:*

Be it known that I, JOHN KIEL, a citizen of the United States, residing at Moline, in the county of Rock Island and State of Illinois, have invented certain new and useful Improvements in Harrows, of which the following is a specification, reference being had therein to the accompanying drawing.

This invention relates to improvements in that class of harrows adapted to cultivation of the center and opposite sides of a furrow simultaneously, and my object is to provide a harrow of light and simple construction, that will be effective in operation without injury to growing plants.

Referring to the drawings:—Figure 1 is a perspective view of a harrow constructed in accordance with my invention. Fig. 2 is a rear elevation of the harrow, and Figs. 3 and 4 are details.

Similar letters refer to similar parts throughout the several views.

1, 2, and 3 indicate tooth-bars journaled on side-bars 4, 5, of the frame 6, and carrying the desired number of teeth secured thereon. The side-bars 4, 5, are inclined upwardly forward of the tooth-bar 1, and are connected at their forward ends by a bar 7 which may be integral with the side-bars, or separate as shown. The tooth-bars 1, 2 and 3 are preferably U-shape in cross-section, and as mounted their central portions are in a substantially horizontal plane, and their end portions inclined upward at an angle most effective for the work required of the harrow, and terminating in substantially the same horizontal plane. Mounted on each of the tooth-bars 1, 2 and 3, and preferably central thereof, is an arm 8 pivotally connected at its upper end to a rocking-bar 9, to which is fastened a notched segment 10; a lever 11 is secured to one of the arms 8, in this instance to the arm 8 on the tooth-bar 1, and carries a dog 12 which, in a well known manner, engages with the notches of the segment 10 to hold the tooth-bars in any position they may be rocked by operation of the lever 11.

Filler-blocks 13 are secured to the tooth-bars 1, 2 and 3 at the point where the latter are journaled on the side-bars 4, 5, and partially form the bearings of the tooth-bars. The tooth-clamps 14, of a type common in the art, permit a vertical adjustment of the teeth, so that the latter can be adjusted to conform to the width and depth of a furrow.

15 is a seat mounted on a support, the legs 16, 17, of which, are firmly secured to the side-bars 4, 5, respectively.

To protect plants, between rows of which the harrow may be operated, I provide fenders 18, 19, which are attached to each side of the harrow, projecting beyond the ends of the tooth-bars, 1, 2 and 3, approximately in the same plane as the ends of the tooth-bars, and substantially parallel with the side-bars 4, 5. The rear end of the fender 18 is bolted, preferably, to the leg 16 of the seat support, and its forward end is secured to the front of the harrow-frame; the fender 19 is mounted on the opposite side of the harrow, and secured to the leg 17 of the seat support and the front of the harrow as shown.

I do not confine myself to the use of a U-shaped tooth-bar, or to the use of a filler-block and tooth-fastener of the type shown in the drawings, as it is evident other forms can be employed without altering my invention.

I claim—

1. In a harrow, the combination with a frame, of tooth carrying bars on the frame, the central portions of the tooth-carrying bars being horizontally disposed, and their end portions inclined upwardly.

2. In a harrow, the combination with a frame, of tooth carrying bars rockable thereon, and having their central portions horizontally disposed and their end portions inclined upwardly at an angle thereto.

3. In a harrow, the combination with a frame, of tooth-carrying bars on the frame having their central portions horizontally disposed and their end portions terminating in substantially the same plane and inclined upwardly at an angle to their central portions.

4. In a harrow, the combination with a frame having side-bars, of tooth-carrying bars having their central portions horizontally disposed and journaled on the side-bars, and having their end portions inclined upwardly at an angle to their central portions.

5. In a harrow, the combination with a frame having parallel side-bars, of tooth-carrying bars having their central portions horizontally disposed and journaled on the side-bars and having their end portions inclined upwardly at an angle to their central portions.

6. In a harrow, the combination with a frame, of tooth-carrying bars on the frame having their central portions horizontally disposed and their end portions inclined upwardly at an angle to their central portions, and a lever mechanism to rock the bars to vary the inclination of the teeth.

7. In a harrow, the combination with a frame, of tooth-carrying bars on the frame and having their end portions inclined upwardly and their central portions horizontally disposed, and a lever mechanism to rock the bars to vary the inclination of the teeth.

In testimony whereof I affix my signature, in presence of two witnesses.

JOHN KIEL.

Witnesses:
HARLAND E. RICH,
ANNA A. CONNELL.

Copies of this patent may be obtained for five cents each, by addressing the "Commissioner of Patents, Washington, D. C."